United States Patent
Hauptmann et al.

(10) Patent No.: US 6,604,037 B1
(45) Date of Patent: Aug. 5, 2003

(54) CIRCUIT SYSTEM AND METHOD OF CONFIGURING AN INTERFACE OF A CONTROL OR REGULATING DEVICE

(75) Inventors: Veith Hauptmann, Hanau (DE);
Torsten Kerz, Essenheim (DE);
Thomas Pietsch, Sulzbach/Ts. (DE);
Christoph Mross, Stuttgart (DE);
Michael Meyer, Altenstadt (DE); Uwe Jocubeit, Königstein/Ts. (DE)

(73) Assignee: Continental Teves, AG & CO. OHG, Frankfurt (DE)

( * ) Notice: Subject to any disclaimer, the term of this patent is extended or adjusted under 35 U.S.C. 154(b) by 0 days.

(21) Appl. No.: 09/937,247

(22) PCT Filed: Mar. 22, 2000

(86) PCT No.: PCT/EP00/02514
§ 371 (c)(1),
(2), (4) Date: Mar. 21, 2002

(87) PCT Pub. No.: WO00/56585
PCT Pub. Date: Sep. 28, 2000

(30) Foreign Application Priority Data

Mar. 22, 1999 (DE) .......................................... 199 12 767
Feb. 29, 2000 (DE) .......................................... 100 09 366

(51) Int. Cl.$^7$ .............................................. B60R 22/00
(52) U.S. Cl. .............................. 701/48; 701/33; 701/35; 701/36
(58) Field of Search .............................. 701/25, 24, 33, 701/35, 36, 48

(56) References Cited

U.S. PATENT DOCUMENTS

| 5,274,636 | A | | 12/1993 | Halter et al. |
| 5,297,143 | A | | 3/1994 | Fridrich et al. |
| 5,475,687 | A | | 12/1995 | Markkula et al. |
| 5,941,925 | A | * | 8/1999 | Hess et al. .................... 701/91 |

FOREIGN PATENT DOCUMENTS

| DE | 29 52 500 | 7/1981 |
| DE | 36 24 456 | 1/1988 |
| DE | 36 37 261 | 5/1988 |
| DE | 692 13 809 | 11/1992 |
| DE | 42 29 931 | 3/1994 |
| DE | 693 19 567 | 7/1994 |
| DE | 43 15 494 | 9/1994 |
| DE | 196 15 105 | 10/1997 |
| EP | 0 699 562 | 3/1996 |
| EP | 0 701 106 | 3/1996 |
| WO | 98/54872 | 12/1998 |

* cited by examiner

*Primary Examiner*—Gertrude Arthur

(57) ABSTRACT

A circuit system for configuring an interface of a control or regulating device to a signal transmission system by an interface module includes a first memory which is dependent on the control or regulating device and has a first signal table which contains data for describing substantially all possible signals which are provided to the signal transmission system (15) by way of the interface, and a second memory which is independent of the control or regulating device and has a second signal table which contains the current data for describing the current interface.

20 Claims, 1 Drawing Sheet

CIRCUIT SYSTEM AND METHOD OF CONFIGURING AN INTERFACE OF A CONTROL OR REGULATING DEVICE

BACKGROUND OF THE INVENTION

The present invention relates to a circuit system for configuring an interface of a control or regulating device, especially an electronic controller of a vehicle control system, such as ABS, EBD, TCS, or ESP, to a signal transmission system, especially a serial vehicle bus system, such as a CAN bus, by an interface module. Further, the present invention relates to a method of configuring an interface of a control or regulating device, especially an electronic controller of a vehicle control system, such as ABS, EBD, TCS, or ESP, to a signal transmission system, especially a serial vehicle bus system, such as a CAN bus, wherein the interface is provided and adaptable by means of an interface module for the signal transmission system.

Functionality, operating facility, comfort, and safety have been improved greatly in the past years by the technical development of vehicles, in particular automotive vehicles, among others by the use of electronic control or regulating systems, such as driving safety systems (anti-lock system (ABS), traction slip control system (TCS), or Electronic Brake Force Distribution (EBD)), driving dynamics control (ESP), electronic engine control and driver information and communications system. This involves a considerable increase in the exchange of data between the electronic components, with the result that the number and length of electric lines of the network system and the number of electric plug connections is constantly increasing. Conventional cabling techniques can scarcely cope with the demanded data exchange between the individual control devices and various terminal devices, such as operating elements, sensors and consumers/actors (e.g. motors, valves or indicating elements).

These problems can be solved by the use of serial bus systems. Special bus systems, especially the so-called 'CAN bus' (Controller Area Network, described in ISO 11 519-2 and ISO 11 898), the so-called 'SCP bus', the so-called 'VAN bus' or the so-called 'J1850 bus' ha[b]ve been developed for application in automotive vehicles. The control or regulating devices, that means in particular the microcomputers, in the bus system communicate by way of interfaces and the bus with the other system components. To this end, corresponding signal lines and electronic/electric components such as signal conditioners, transmitters, receivers, and control devices are provided which sense or output individual signals or reports (messages which contain several signals) or directly switch on or off the electric consumers/actors.

The CAN bus gained acceptance as a standard especially for the application in automotive vehicles. A number of equally entitled control or regulating devices are interconnected in the CAN bus by a linear bus structure. Coupling of the individual customers to the bus structure is effected by a bus node. A bus node is basically composed of the control or regulating devices and an interface module (interface controller).

The data for an individual message and signal processing operation and the initialization parameters for the interface configuration is/are invariably implemented in the control or regulating program of the control or regulating device (microcomputer).

On the basis of the stored data for the individual message and signal processing operation or of initialization parameters for the interface, the type of operation of the bus (type of operation of the output drivers and condition of the interface) are initially adjusted by the microprocessor by means of the interface module.

A change of the implemented interface configuration is possible only with a relatively high expenditure, that means, repeated programming of the microcomputer with a subsequent compiling and linking of the current program [2] is necessary.

An object of the present invention is to improve the prior art circuit system and the prior art method of configuring an interface of a control or regulating device, especially an electronic controller of a vehicle control system, to a signal transmission system, especially a vehicle bus system, such as a CAN bus, and to permit a flexible and safe new configuration which is technically simple to achieve.

SUMMARY OF THE INVENTION

A principal aspect of the present invention involves that the circuit system includes a first memory which depends on the control or regulating device and has a first signal table which contains data for describing substantially all possible signals which are provided to the signal transmission system by way of the interface, and that the circuit system includes a second memory which is independent of the control or regulating device and has a second signal table which contains the current data for describing the current interface.

Thus, according to the present invention, the signal tables are split in two segments or, respectively, two signal tables are provided: a first (internal) signal table and a second (external) signal table. These separate table segments or tables are associated with two separate memories or memory areas. The advantage of the present invention lies basically in that the second memory or the data stored therein, in contrast to the first memory, is not directly involved in the current program of the control or regulating device and, thus, is principally relatively easy to modify or adapt.

The term 'two separate memories' in the sense of the present invention means that two separate memory modules are provided and, also, that a separation can be achieved by two separate memory areas in one single memory module;

This is advantageous in that updating of the data in the second signal table and, thus, establishing or adapting an interface to a predetermined signal transmission system, in particular a vehicle bus system, can be achieved flexibly, quickly and in a technically simple fashion. For example, it is arranged for to employ easy-to-modify memories, such as RAM memories (especially buffered RAM memories), flash memories or EEPROM memories as modules for the second memory.

When the data prevails in a modifiable memory, an 'offline' or 'online' modification of the data is possible.

In the modification referred to herein by the term 'offline', the signal table is modified by means of a memory configuration device, preferably by an external program. The result comprises data or a table in a language which is compatible to the programming language used for the current program of the control or regulating device. This data or table is subsequently integrated into the current program by compiling and linking. Thereafter, the entire program must be loaded, e.g. by download, into the control or regulating device or [said's] corresponding component, especially microprocessor.

For a modification referred to as 'online', the signal table is also modified according to the present invention by a memory configuration device, preferably, by an external program. In this case, however, the result comprises data or tables in a form, e.g. a binary code, which can be downloaded directly into the memory of the control or regulating device or the microprocessor. A modification of the second signal table in the second memory by means of online modification is preferred in the present invention.

It is also envisaged in the present invention that several different variations of the signal tables are stored in a non-modifiable memory, e.g. a ROM, and a defined variation is selected in a case of need. Preferably, this selection can also be performed online for the second signal table.

The first signal table is preferably produced when the function code for the control or regulating device is developed, that means in the compiling and linking operation (offline modification). All signals described in this first signal table can (but do not have to) be supplied to the signal transmission system. The first signal table can easily be modified by a memory configuration device, preferably by an external program, e.g., by inserting or removing new signals. The modifications are only adopted into the current program [2] of the control or regulating device or the microcomputer in the new translating and linking operation.

According to the present invention, the first signal table includes for each signal at least data for the signal type (e.g. a timer for the signals set, reset or timer, an up to 16 bit long character string for a signal, a 1 to 64 bit long character string for a block and/or a constant), for the position (e.g. a RAM address), for the length of the signal, and for the signal origin (e.g. a RAM address) and a special name for describing the function of the signal.

The second signal table contains the current interface description and is easy to modify retroactively by a configuration device, preferably by an external program. The second signal table contains at least data for the initialization of the interface (e.g. a Baud rate for the transmission speed and a bit timing for the interface configuration), for the type of messages transmitted (e.g. a time-controlled and/or event-driven report-related rate of repetition as a transmitting or receiving pattern) and for a type of report (e.g. transmitting or receiving report) as well as for the number of signals contained in the message (e.g. for the position and length of the signal within the message), and for the allocation to the data in the first signal table.

The circuit system of the present invention and the method of the present invention shall now be explained exemplarily in greater detail by way of the accompanying drawing Figure.

DETAILED DESCRIPTION OF THE INVENTION

Figure 1:
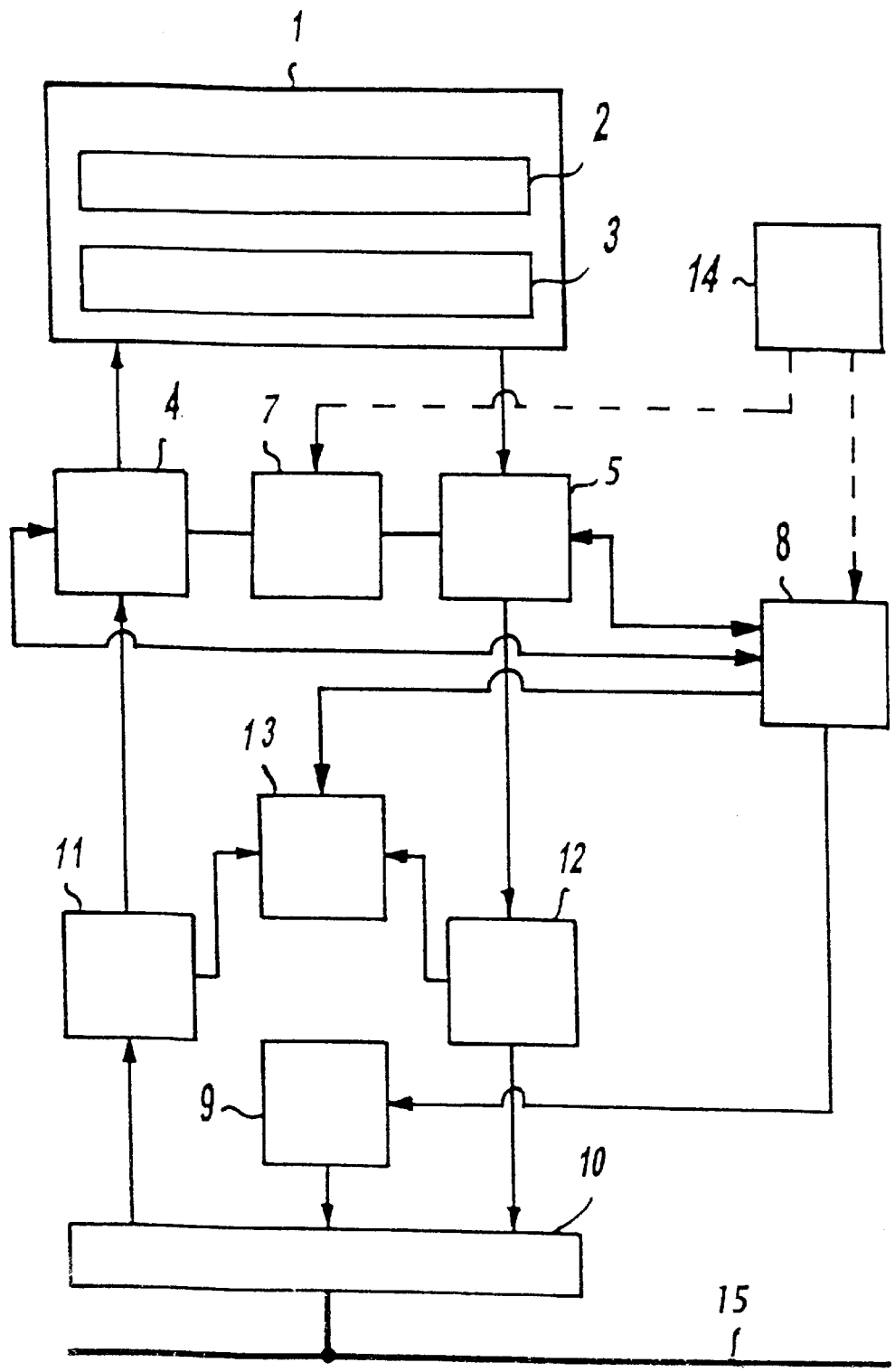
FIG. 1 schematically shows an embodiment of the circuit system according to the present invention.

The circuit system shown in FIG. 1 is comprised of an electronic controller of a vehicle control system 1 which contains a program 2 for a vehicle control and RAM memory 3 associated with this program 2. The RAM memory is in connection with a receiving channel 4 for receiving messages and a transmitting channel 5 for transmitting messages. The signals received or to be sent are conditioned, selected, and further processed by means of the receiving channel 4 or the transmitting channel 5, respectively. Receiving channel 4 and transmitting channel 5 are connected to a first memory 7 (internal memory) that is dependent on the control or regulating device and an independent second memory 8 (external memory). These memories 7, 8 may principally also be realized as storage sections of a memory (not shown herein). In the internal memory or storage section 7, the signals to choose from are stored in the form of a first (internal) signal table, and the data by which the interface is currently described (second or external signal table) are stored in the external memory 8. The external memory 8 is connected to an interface module 10 by way of an initialization unit 9. The interface module 10 is in connection to the receiving channel 4 and the transmitting channel 5 by way of a receiving unit 11 and a transmitting unit 12. Also, there is provision of a monitoring unit 13 which is in connection to the receiving unit 11 and transmitting unit 12 and the external memory 8. In case of need, the content of the external memory 8 can be modified by a memory configuration device 14, preferably by an external program (dotted arrow). The interface module 10 is connected to a bus line 15. The arrows (not referred to in detail) represent the basic signal flow or the direction of data transmission of this system. It is provided according to the present invention that all components of the described circuit system, with the exception of the memories 7 and 8 and the interface module 10, are realized by a software program.

When a report is sent to the bus system, all pertaining external signals, that means signals which are listed in the table of the external memory 8, are processed one after the other by the transmitting channel 5. First, the linking to the data for these signals which are stored in the internal memory 7 is analyzed by the transmitting channel 5. Subsequently, the signal in the transmitting channel 5 is further processed accordingly, or a corresponding function is performed and, as the case may be, the result is stored at a corresponding location in the report.

Each message to be sent contains a transmission timer. Said transmission timer is incremented by the transmitting unit 12 in an invariable time frame. When the transmission timer has reached a value stored in the external table, the message with the pertaining signals is transmitted by the transmitting unit 12. The transmission timer is simultaneously reset.

It is also possible to transmit messages in an event-driven way. Upon the occurrence of an event caused by the program 2 or the monitoring unit 13, the corresponding report is transmitted one time by the transmitting unit 12. The event-driven and the timer-controlled transmission may also be employed in combination. Defined messages with an invariable transmission pattern may also be transmitted at once, irrespective of their destined transmission time, when a defined event occurs, for example, in a case of disturbance (e.g. signal for switching on a warning lamp in a case of malfunction).

Upon receipt of a report, the signals received are interpreted by the receiving channel 4 according to the data stored in the first and second signal table. In case the message has a signal with the timer type, the said is set to a value defined in the first signal table. Timers are decremented in an invariable time frame, and a corresponding timeout function, this means especially in the event of entry of errors or failure of a message, is invoked at the value zero (0).

Monitoring with respect to failure of the report or to permanent transmission errors is effected by means of the monitoring unit 13. The specific errors recognized, that means errors which relate to other bus nodes or the entire bus, are stored.

The data in the second signal table is very easy to modify by the application of the memory configuration device 14, preferably, by an external program. This permits flexibly adjusting the interface parameters for the communication and modifying them with great operating facility by an appropriate software program with e.g. a well-reasoned menu program for the adjustment of parameters. The selected interface parameters are favorably converted into a compilable code by means of this program. The external program can advantageously be stored in a transportable microcomputer (e.g. laptop) so that an in situ modification can be effected, for example, in an automotive vehicle directly at a customer's premises or in a workshop.

Thereafter follows the exchange of the second signal table by download into the second memory 8 which is configured as a RAM memory or flash segment, for example. An exchange of the corresponding memory modules, e.g. EPROM memories or EEPROM memories, is also possible. It is further envisaged that different sets of the second signal table may be provided in the mentioned memory modules, and that a corresponding desired signal table is selected and activated in case of need.

In addition, it is also possible to modify the internal first signal table by means of an external, preferably transportable configuration device, with the modification itself taking place offline.

The advantage of the present invention involves, above all, that a simple and flexible adaption to a prevailing communication interface is possible without a direct modification of the program, that means the controlling or regulating software, and the implementation of the second signal table can also take place online in a very reliable fashion. Besides, the data in the first memory favorably represents a signal pool, in which all possible signals are described, with the result that this signal pool can be used as a standard for different applications. It is thus possible to produce or adapt the communication interfaces quickly and easily, and reports, signals, or individual signal data can be inserted, masked, or packaged.

What is claimed is:

1. A circuit system for configuring an interface of a control or regulating device to a signal transmission system by an interface module, the circuit system comprising a first memory which depends on the control or regulating device and has a first signal table which contains data for describing substantially all possible signals which are provided to the signal transmission system by the interface, and a second memory which is independent of the control or regulating device and has a second signal table which contains current data for describing the interface.

2. A circuit system as claimed in claim 1, further comprising that the data in the second signal table of the second memory is modified by a memory configuration device that is an external program.

3. A circuit system as claimed in claim 1, further comprising that the modifications of the data in the first signal table of the first memory are directly implemented into the control or regulating device or are directly adopted into a current program of the control or regulating device.

4. A circuit system as claimed in claim 1, further comprising that the data in the first signal table of the first memory includes the signal type, the position and the length of the signal, and the signal origin.

5. A circuit system as claimed in claim 1, further comprising that the current data in the second signal table of the second memory contains data for the initialization of the interface, the type and number of the messages transmitted, the signal type, the position and length of the signal within a message, the monitoring information, and the allocation to the data in the first signal table.

6. A circuit system as claimed in claim 1, further comprising that the second memory is a RAM memory, flash memory, or EEPROM memory.

7. A circuit system as claimed in claim 1 wherein the control or regulating device is an electronic controller of a vehicle control system.

8. A circuit system as claimed in claim 7 wherein the vehicle system is from the group consisting of ABS, EBD, TCS and ESP.

9. A circuit system as claimed in claim 1 wherein the signal transmission system is a serial vehicle bus system.

10. A circuit system as claimed in claim 9 wherein the serial vehicle bus system is a CAN bus.

11. A method of configuring an interface of a control or regulating device to a signal transmission system, wherein the interface is provided and adaptable by means of an interface module for the signal transmission system, comprising providing a first memory which depends on the control or regulating device and stores data that describes substantially all possible signals provided to the signal transmission system by the interface, and storing data describing the current interface in a second memory which is independent of the control or regulating device.

12. A method as claimed in claim 11, further comprising that initially the interface module is initialized by means of the data of the second signal table, in that subsequently during transmission of a report to the signal transmission system the signals to be sent are processed in the second memory, wherein at first the linking to the data for the signals stored in the first memory is analyzed, and subsequently the signal is further processed accordingly, or a corresponding function is performed and, as the case may be, the result is stored at a corresponding location in the report before the signals are forwarded via the interface into the signal transmission system, or upon receipt of a report from the signal transmission system the signals received are interpreted according to the data in the first and second signal tables and processed, as the case may be, or a corresponding function is performed and, as the case may be, the result is stored at a corresponding location in the memory which has direct access to the current program of the control or regulating device.

13. A method as claimed in claim 11, further comprising that data in the second signal table is stored in a RAM memory, a flash memory, or a flash segment and is replaced or corrected by a download of new data, or in that data in the second signal table is stored in a memory module that is an EPROM memory or EEPROM memory and is replaced or corrected by exchange of the memory module.

14. A method as claimed in claim 11, further comprising that the second signal table contains several data records which are selected and activated for the purpose of replacement or correction of the interface.

15. A method as claimed in claim 11, further comprising that the data in the first signal table is replaced or corrected offline by a memory configuration device such that modifications are not implemented directly into the control or regulating device or are not adopted directly in a current program of the control or regulating device and are adopted in the current program of the control or regulating device only after a new compiling and linking of the control or regulating program or at least a program part.

16. A method as claimed in claim 11, further comprising that the data in the second signal table is replaced or corrected online by a memory configuration device that is an external program, and is adopted directly in the current program of the control or regulating device.

17. A circuit system as claimed in claim 11 wherein the control or regulating device is an electronic controller of a vehicle control system.

18. A circuit system as claimed in claim 17 wherein the vehicle system is from the group consisting of ABS, EBD, TCS and ESP.

19. A circuit system as claimed in claim 11 wherein the signal transmission system is a serial vehicle bus system.

20. A circuit system as claimed in claim 19 wherein the serial vehicle bus system is a CAN bus.

* * * * *